Aug. 28, 1951 W. A. KYSOR 2,565,563
INTERNAL-COMBUSTION ENGINE CONTROL APPARATUS
Filed Nov. 4, 1949 4 Sheets-Sheet 1
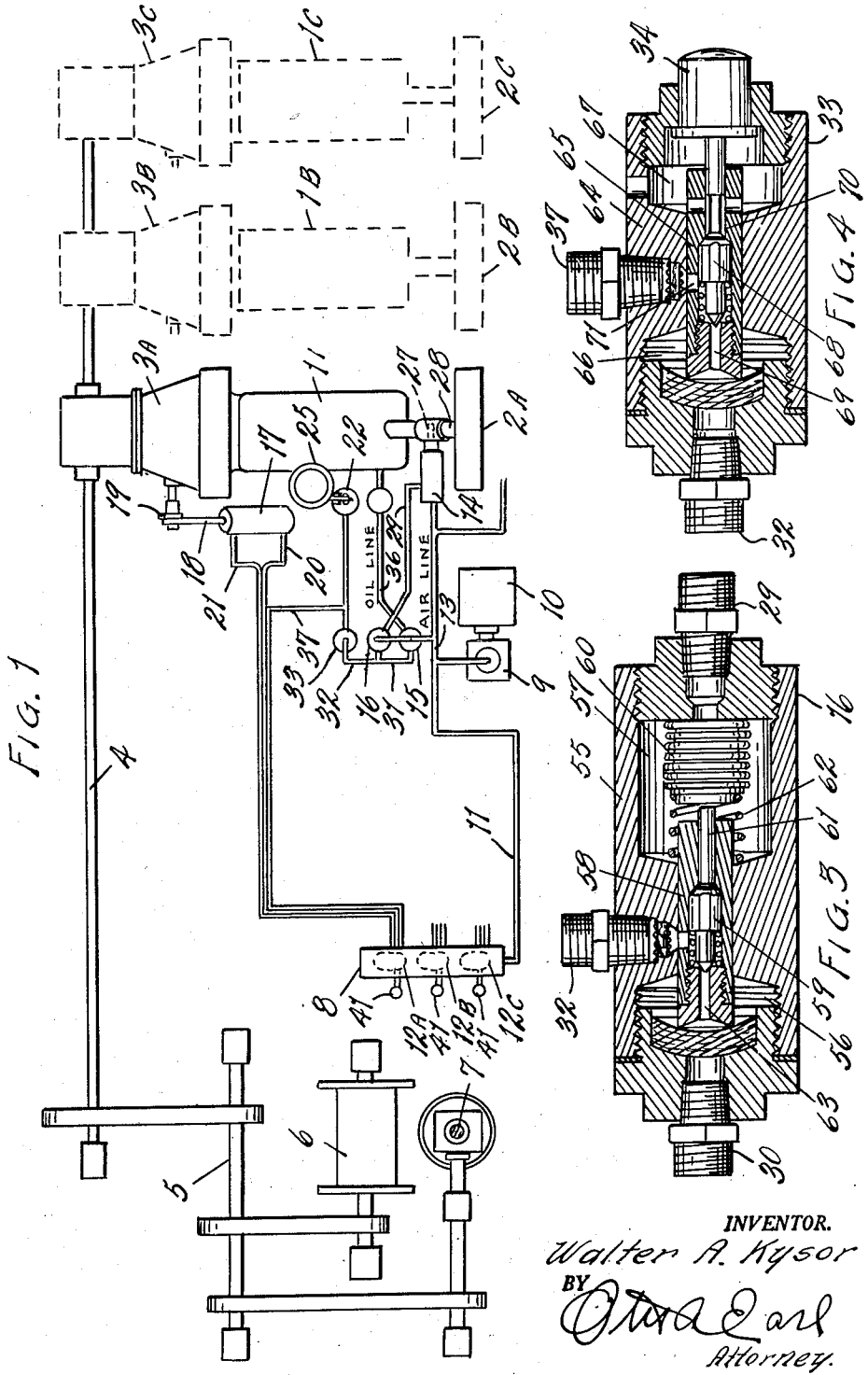
INVENTOR.
Walter A. Kysor
BY
Attorney.

Aug. 28, 1951  W. A. KYSOR  2,565,563
INTERNAL-COMBUSTION ENGINE CONTROL APPARATUS
Filed Nov. 4, 1949  4 Sheets-Sheet 2
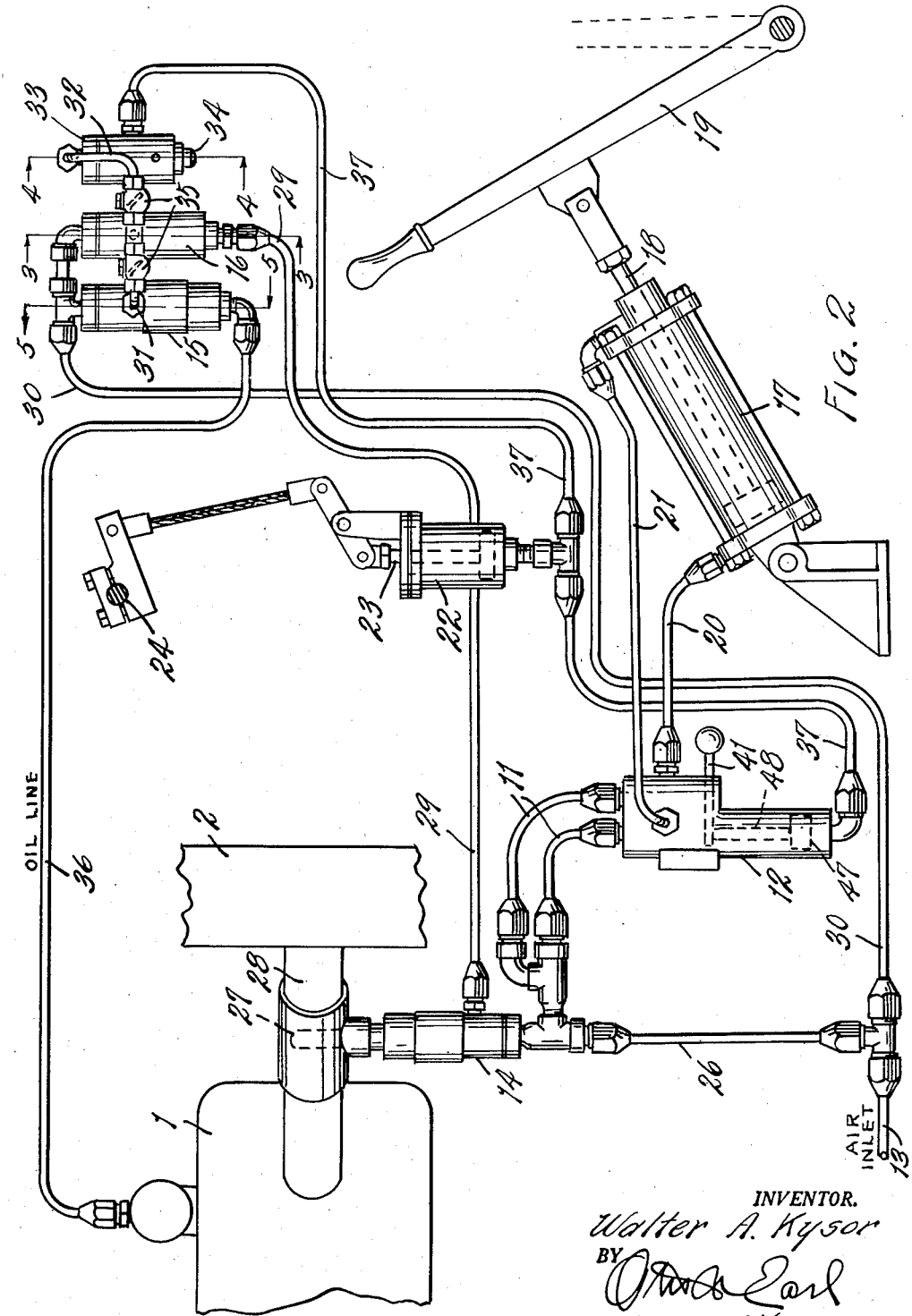
FIG. 2
INVENTOR.
Walter A. Kysor
BY
Attorney

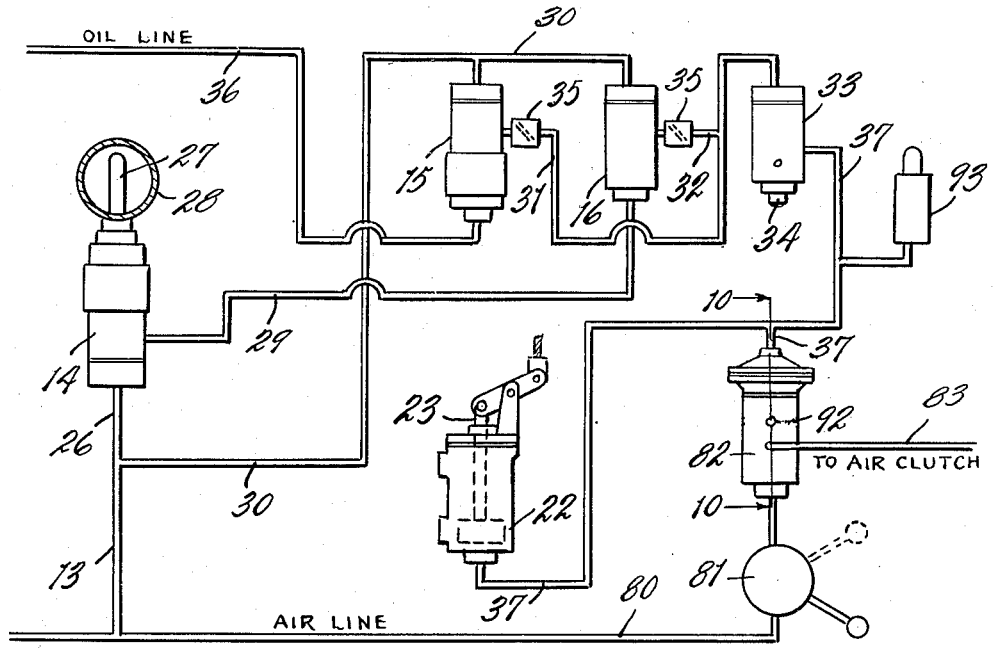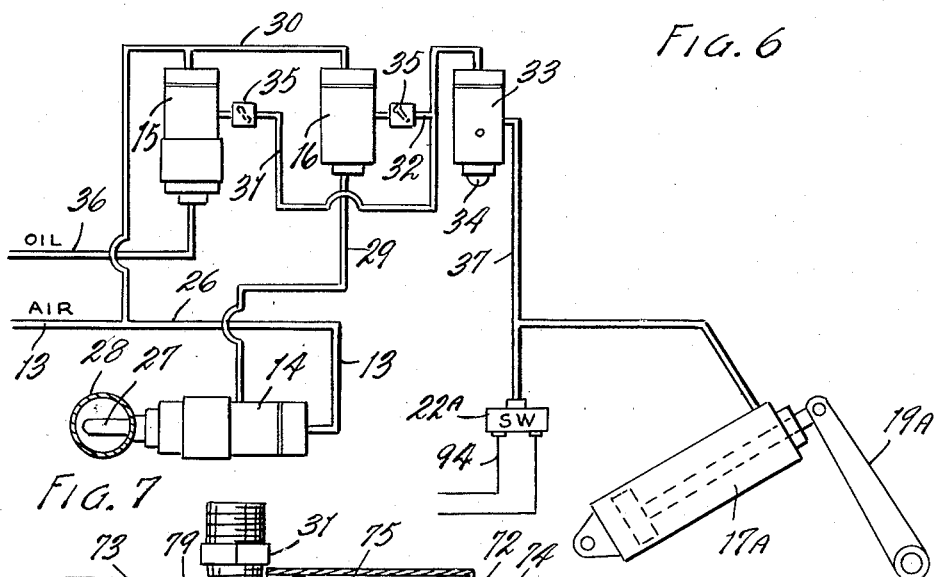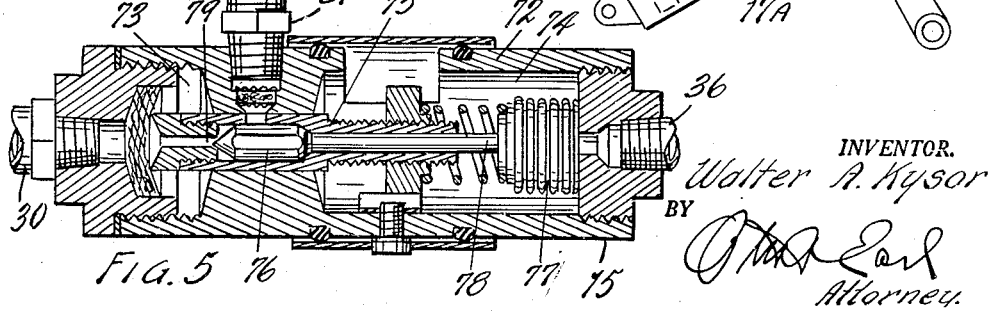

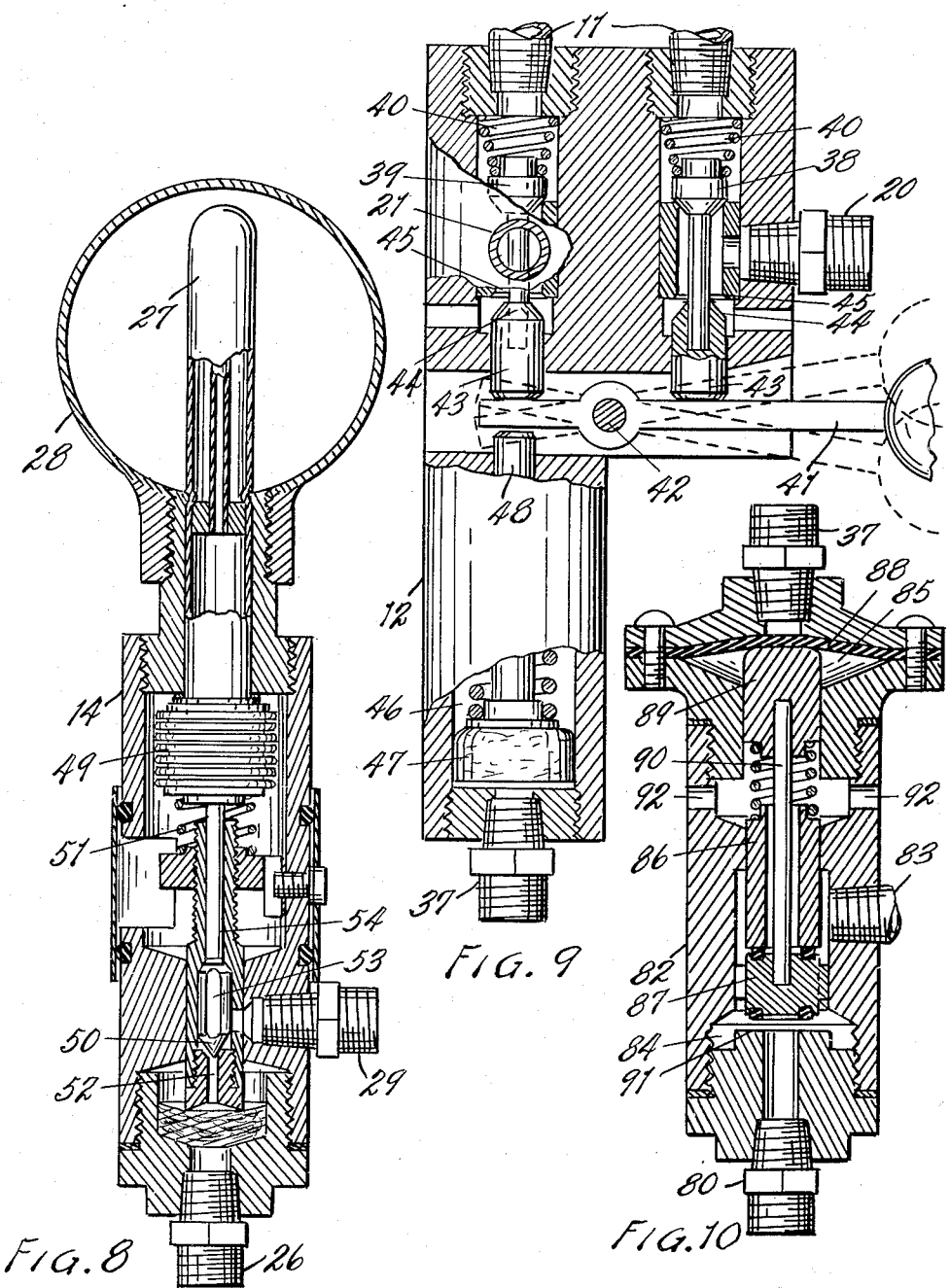

Patented Aug. 28, 1951

2,565,563

UNITED STATES PATENT OFFICE 2,565,563

INTERNAL-COMBUSTION ENGINE CONTROL APPARATUS

Walter A. Kysor, Cadillac, Mich., assignor to Kysor Heater Company, Cadillac, Mich.

Application November 4, 1949, Serial No. 125,624

14 Claims. (Cl. 192—.096)

This invention relates to improvements in remote and emergency control system for internal combustion engines.

The principal objects of this invention are:

First, to provide a system of controls by means of which an internal combustion engine located remotely from an operating position can be manually engaged with or disengaged from its load and by means of which control system malfunctioning of the engine will automatically result in the engine being disconnected from the load.

Second, to provide a system of controls particularly adapted for use in oil field operation for controlling the operation of a plurality of internal combustion engines connected in multiple to drive a well drilling rig and located remotely from the rig.

Third, to provide a pneumatically operated declutching and de-energizing system for an internal combustion engine with control valves responsive to the temperature of the engine and the oil pressure in the lubricating system of the engine whereby either overheating of the engine or failure of the oil pressure will result in disconnecting the engine from the load and shutting down the engine.

Fourth, to provide pneumatically operated controls for an internal combustion engine in which compressed air may be supplied to the controls either by means of a first valve in which air pressure and oil pressure are balanced under normal operating conditions or a second valve in which two sources of air pressure, one of which is under thermostatic control, are balanced against each other under normal operating conditions.

Fifth, to provide a system of manual and automatic controls for multiple engine power installations which will disconnect one or more of the several engines from the load to prevent that engine or engines from becoming a drag on the remaining engines in case of failure of the disconnected engine.

Sixth, to provide a pneumatic control system for an internal combustion engine particularly adapted for actuating a pneumatic clutch associated with the engine to manually or automatically disengage the clutch.

Other objects and advantages relating to details of my invention will be apparent from a consideration of the following description and claims.

Drawings, of which there are four sheets, illustrate three possible arrangements of my control system, any one of which may be desired over the others under certain operating conditions.

Fig. 1 is a plan view showing one form of the control system as installed on the driving engines of an oil well drilling rig. The engines and rig are illustrated conventionally.

Fig. 2 is an enlarged detail view of the elements of the control system shown in Fig. 1.

Fig. 3 is a longitudinal cross-sectional view through the air balanced valve shown in Figs. 1 and 2 and taken along the plane of the line 3—3 in Fig. 2.

Fig. 4 is a longitudinal cross-sectional view through the manually controlled starting valve shown in Figs. 1 and 2 and taken along the plane of the line 4—4 in Fig. 2.

Fig. 5 is a longitudinal cross-sectional view through the air-oil balanced valve shown in Figs. 1 and 2 and taken along the plane of the line 5—5 in Fig. 2.

Fig. 6 is a diagrammatic view conventionally illustrating a modified form of my control system adapted for use with internal combustion engines having pneumatically expansible and engageable clutches.

Fig. 7 is a diagrammatic view conventionally illustrating a third form of my control system arranged to pneumatically disengage an engine clutch and de-energize the ignition of a gasoline engine.

Fig. 8 is a longitudinal cross-sectional view through the thermostatically operated control valve shown in Figs. 1, 2, 6 and 7.

Fig. 9 is an enlarged,. detailed view partially broken away in longitudinal cross-section of the automatically and manually operated valve illustrated in Figs. 1 and 2.

Fig. 10 is a longitudinal cross-sectional view through the air clutch operating valve shown in Fig. 6.

My control system is designed primarily for use in oil fields where it is common practice to utilize a plurality of driving engines connected in multiple for operating an oil well drilling rig. However, the control system obviously would be operative in other instances where one or more engines are to be controlled from a point remotely located with respect to the engines. Particularly in multiple engine installations, it is desirable to be able to automatically disconnect an engine from the power train in the event the engine should overheat for any reason or should lose the pressure in its lubricating system. It is further desirable to immediately and automatically effect this disconnection so that the faulty engine will not be driven by the other engines remaining in the power train and thus cause possible serious damage to the faulty engine.

In Fig. 1 I have conventionally illustrated a series of internal combustion engines 1A, 1B and 1C, each provided with a radiator 2A, 2B and 2C and clutch 3A, 3B and 3C. The engines are connected through their clutches to a power shaft 4 which extends some distance from the engines to an oil well drilling rig indicated conventionally at 5. The drilling rig may include a hoisting drum 6 and bit rotating head 7 and such other mechanisms as are commonly required in drilling an oil well. In operating a drill rig of this general type it is necessary for the driller to remain close to the rig at all times and my system provides a control panel 8 mounted adjacent to the driller's position so that the engines can be controlled from this point.

The controls for each of the engines are identical so that a description and illustration of one of the control systems will suffice. The system includes an air compressor 9 driven by an auxiliary engine 10 or other suitable source of power, as, for instance, the main power shaft 4. The air compressor 9 is connected through a first supply conduit 11 to the manually controlled valves 12A, 12B and 12C mounted on the panel 8 and each associated with one of the engines 1. The air compressor is further connected by means of a primary air conduit 13 to a thermostatically controlled valve 14 on each engine and to an air-oil balanced valve 15 and an air to air balanced valve 16 associated with each engine.

Each individual engine is provided with a double acting pneumatic cylinder 17 having a piston rod 18 connected to engage or disengage the clutch of the engine by operation of the clutch lever 19. Compressed air is selectively supplied to the opposite ends of the pneumatic cylinder from the manual control valve 12 through the declutching air conduit 21 or the clutch engaging air conduit 20.

Each engine is further provided with a pneumatic cylinder 22 having a piston 23 connected to an essential control element of the engine such as the fuel rack shaft 24 in Fig. 2 or the carburetor 25 in Fig. 1. The piston 23 is so connected that when compressed air is supplied to the cylinder 22, the engine will be shut down by shutting off the supply of fuel or by de-energizing the ignition system, as will be explained presently.

The operation of the pneumatic controls is most clearly illustrated in Fig. 2. The primary air supply conduit 13 is provided with one branch 26 connected to the thermostatic valve 14. The valve 14 includes a thermally responsive bulb 27 projecting into the cooling water tube 28 of the engine to respond to changes in the temperature of the engine. The valve 14 is effective, as will be explained in greater detail presently, to permit the flow of compressed air from the conduit 26 to a secondary air conduit 29 so long as the temperature of the bulb 27 and the cooling water of the engine is normal. Should the temperature of the engine rise abnormally for any reason, the valve 14 is operative to shut off the supply of secondary air through the conduit 29.

The primary air conduit 13 has another branch 30 extending to the upper ends of the air-oil balanced valve 15 and the air to air balanced valve 16. Each of the balanced valves 15 and 16 are connected through conduits 31 and 32 to a manually operated shut-off valve 33 having a normally open push button control 34. Check valves 35 are provided in each of the conduits 31 and 32.

Oil under pressure of the lubricating system of the engine is supplied from the engine through the conduit 36 to the lower end of the valve 15. The valves 15 and 16 are of a balanced type, which will be described in greater detail presently. The air-oil balanced valve 15 is operative to remain in closed position so long as oil pressure in the conduit 36 is balanced against primary air pressure in conduit 30. In this position, no air flows through the conduit 31 to the shut-off valve. However, should the oil pressure in the engine fail for any reason, the primary air pressure in conduit 31 will move the valve 15 to open position permitting primary air to pass through the conduit 31.

The air to air balanced valve 16 is normally balanced to close position by the pressure of primary air from the conduit 30 and the pressure of secondary air from conduit 29 and no pressure is transmitted through the conduit 32 to the shut-off valve 33. However, should the engine overheat and actuate the thermostatic valve 14 to shut off the supply of secondary air to the conduit 29, the valve 16 will immediately be unbalanced and permit the flow of primary compressed air through the conduit 32 to the shut-off valve.

The shut-off valve 33 is normally open, as previously stated, and any air admitted thereto, which for convenience may be called emergency air, passes freely through the conduit 37 to the fuel control pneumatic cylinder 22 and to the bottom of the manual control valve 12. This emergency air is effective, as previously explained, to shut off the engine by discontinuing its fuel supply, and the valve 12 is operative to automatically disengage the clutch of the engine.

The manual control valve 12 includes a pair of valve elements 39 and 38 (see Fig. 9) communicating on their discharge sides respectively with the declutching and clutch engaging ends of the pneumatic cylinder 17 by the conduits 21 and 20. The valve elements 38 and 39 are each supplied with primary compressed air from branches of the conduit 26 and are spring-biased to closed position by the springs 40. The valve elements 38 and 39 are selectively and alternately engageable with an operating lever 41 on opposite sides of the pivot 42 of the lever. Thus either of the valve elements may be manually opened by operation of the lever 41 to manually engage or disengage the clutch. Note that the plungers 43 which operate the valve elements from the lever are each provided with tapered valve ends 44 for closing the vent ports 45 when either valve element 38 or 39 is open.

The emergency air conduit 37 which connects to the bottom of the manual control valve 12 admits compressed air to a cylinder 46 for forcing the piston 47 and piston rod 48 upwardly to move the lever 41 and clutch disengaging valve 39 to open position. Thus when compressed air is supplied to the conduit 37 by either of the malfunctions of the engine previously described, the clutch will automatically be disengaged. Note that due to the spring biasing of the piston 47 and valves 38 and 39, the manual control lever 41 will always return to neutral position whenever the supply of emergency air in conduit 37 is cut off. Thus the clutch operating cylinder 17 will normally have both its ends vented through the ports 45 except when the position of the clutch is being changed.

Fig. 8 illustrates the thermostatic control valve 14 in some detail. This valve is substantially identical with the valve disclosed and claimed in my copending application, Serial No. 79,669, filed March 4, 1949, now Patent No. 2,512,548, for Thermostatic Control Valve. It is sufficient to an understanding of my present system to indicate that the valve 14 and thermally responsive bulb 27 are operative through the bellows 49 to move the needle valve 50 against the adjusted pressure of spring 51 to close the inlet port 52 from the branch 26 of the primary air conduit. The supply of secondary air through the conduit 29 is thus shut off, and the secondary conduit is vented through a notched port 53 of the valve element 50 and along the push rod 54 to within the body of the valve 14 and from there to the atmosphere. Cooling of the water in the pipe 28 to normal operating temperature reverses the foregoing action of valve 14 and admits secondary air to the conduit 29.

The details of the air to air balanced valve 16 are illustrated in Fig. 3, which shows the valve to comprise a body element 55 having an air recess 56 formed in one end and a bellows recess 57 formed in the other end. A tubular valve casing 58 extends axially between the recesses and houses a double acting valve element 59. Secondary air pressure admitted through the conduit 29 is contained by the bellows 60 and is operative to expand and press the bellows against the valve push rod 61 and valve element 59 in opposition to the spring 62 and primary air pressure on the valve element. Primary air pressure admitted through the conduit 30 communicates through the port 63 with the valve element 59. When the secondary air pressure is shut off by the thermostatic valve 14, primary air pressure is operative to unseat the valve element 59 and pass through to the conduit 32. Re-establishment of secondary air pressure in the conduit 29 and bellows 60 is operative to reclose the port 63.

The details of construction of the push button valve 33 are shown in Fig. 4. The valve is simple and consists of a body 64 enclosing a valve casing 65 between the inlet chamber 66 and exhaust chamber 67. A double-ended valve element 68 is movable between an inlet port 69 and an exhaust port 70 to alternatively connect the outlet port 71 and emergency air conduit 37 to the conduits 31 and 32 or with the exhaust chamber 67. The valve element 68 is spring biased to open the port 69 and the push button 34 simply overcomes the action of the spring. It will be appreciated that in the system shown in Figs. 1 and 2 the supply of emergency compressed air once established through the conduit 30 and air-oil balanced valve 15 will continue through the emergency conduit 37 to disengage the fuel supply to the engine even after the fault which caused the failure of oil pressure has been corrected. It is therefore necessary to provide the manually controlled shut-off valve 33 to shut off this emergency air and permit the engine to be restarted.

The oil to air balanced valve 15 is shown in detail in Fig. 5. The valve is similar in many respects to the thermally controlled valve 14 and comprises a housing 72 forming an air inlet recess 73 in one end and a bellows recess 74 in the other. The valve casing 75 extends between the recesses and encloses a double acting valve element 76. Oil pressure supplied through the conduit 36 is contained by a bellows 77, and the bellows is operative to push against the push rod 78 to seat the valve element in the air inlet port 79. Failure of the oil pressure for any reason permits primary air from conduit 30 to unseat the valve element 76 and pass through the valve casing to the conduit 31 and shut-off valve 33.

Considering now the modified form of control system shown in Fig. 6, it will be noted that there is provided the same thermally controlled valve 14 and oil to air balanced valve 15 as was described in the previous form of control system. The thermally responsive connection and oil connection to the engine are also the same and are not repeated in Fig. 6. The modified system also includes the air to air balanced valve 16 and manually operated shut-off valve 33 for supplying emergency air to the conduit 37 and fuel control cylinder 22. Primary air is supplied to the valves 15 and 16 by the same branch conduit 30. The system shown in Fig. 6 varies from the previously described system in that primary air from the branch conduit 80 is supplied to a simple manually operated open and shut valve 81 for controlling the admission of air to an exhaust valve 82. Under normal operating conditions, the exhaust valve 82 passes air from the valve 81 directly to a clutch conduit 83 for engaging a pneumatic clutch. Thus the valve 81 is effective to selectively engage or disengage the clutch of the engine and it is contemplated that this form of the system will be used in connection with pneumatic clutches having clutch engaging elements which are expanded by compressed air to directly grip the rotating parts of the clutch.

The exhaust valve 82, as is most clearly illustrated in Fig. 10, consists of a body having an inlet chamber 84 formed in the other end. A sleeve 86 extends between these chambers and forms an exhaust valve seat cooperative with the double ended valve element 87. Air pressure from the conduit 80 and valve 81 is effective to normally bias the valve element 87 against the exhaust seat and permit the flow of air through the chamber 84 to the conduit 83. The diaphragm 88 positioned in the diaphragm chamber 85 presses against the plunger 89 and push rod 90 to move the valve element 87 against an air inlet seat 91 to shut off the supply of compressed air and vent the conduit 83 through the sleeve 86 to the exhaust ports 92. Air for actuating the diaphragm 88 and plunger 89 is supplied by the emergency air conduit 37 along with the air for operating the fuel control piston. Thus upon actuation of either the air to air balanced valve 16 or oil to air balanced valve 15, the supply of compressed air to the pneumatic clutch will be discontinued and the clutch will be vented and disengaged. The difference in area of the valve element 87 and diaphragm 88 assures that the valve 82 will have sufficient power to close the valve element 87 even though there may be some throttling of the emergency air in the valves 15, 16 and 33. Note that the emergency conduit 37 may be supplied with a visual or audio warning signal such as the whistle 93.

Fig. 7 illustrates perhaps the simplest form of my control system. This modified system includes the same thermostatically controlled valve 14, oil to air balanced valve 15, air to air balanced valve 16, and manual shut-off valve 33 and their associated connections as the two previously described forms of the system. Emergency air delivered through the valve 33 to the conduit 37 is transmitted to a single acting pneumatic cylinder 17A arranged to move the clutch lever 19A to clutch disengaged position. Emergency air is also supplied to a pneumatic switch 22A corresponding in function to the pneumatic cylinder 22 of the previously described systems to deenergize the engine, in this case by breaking or grounding the ignition system of the engine indicated conventionally at 94.

The last described form of the system operates in the same manner as the previously described systems to disengage the clutch and shut down the engine upon overheating of the engine or failure of its lubricating oil pressure. No provision is made for manually disengaging the engine. The clutch will have to be manually re-engaged after each emergency disengagement.

I have thus described three highly practical forms of my control system for effecting the automatic and remote control of internal combustion engines of either the external ignition or diesel type. Quite obviously, other modifications or rearrangements of the control system can be effected to meet specialized operating conditions without departing from the theory of my invention as set out in the following claims.

Having thus described my invention, what I claim as new and desire to secure by Letters Patent, is:

1. Control mechanism for an internal combustion engine connectable to a power transmission element and operative from a control position remote from said engine comprising, a double acting pneumatic cylinder connected to engage and disengage the clutch of the engine, a source of compressed air, a thermostatically controlled valve thermally associated with the engine and connected to said source, a secondary air conduit connected to said thermostatic valve and open therethrough to said source in the normal thermal condition of said thermostatic valve and engine but closed from said source by said valve in the overheated condition of said engine, a pair of valves having balanced valve elements, means connecting said pair of valves to said source whereby primary air pressure is exerted against one end of each balanced element to urge said elements to open position, said pair of valves having outlet ports opening to said source in the unbalanced position of said valve elements, a conduit connecting the lubricating oil pressure system of the engine to one of said pair of valves, an expansible element in said one valve responsive to oil pressure in said oil conduit and engageable with the valve element in said one valve in opposition to said primary air pressure, a second expansive element acting against the other of said valve elements in opposition to said primary air pressure, said secondary air conduit being connected to said second expansive element to actuate the same, a manually operative normally open shut-off valve connected to the outlet ports of said pair of valves, check valves positioned in the connections between said shut-off valve and said outlet ports, an emergency air conduit connected to said shut-off valve, a second pneumatic cylinder connected to said emergency conduit to be activated therefrom and connected to close the fuel supply of the engine when activated, a manually controlled valve having a pair of valve chambers connected to said source and having outlet ports connected respectively to the clutch engaging and clutch disengaging ends of said first pneumatic cylinder, valve elements in said chambers biased to closed position, actuating plungers associated with each of said last valve elements, a manually operative lever pivoted on said control valve and engageable with said plungers on opposite sides of its pivot, and a pneumatically operated piston positioned in said control valve and engageable with said lever to move said lever and one of said valve elements to clutch disengaging position, said last pneumatic piston being connected to said emergency conduit to be activated thereby.

2. Control mechanism for an internal combustion engine connectable to a power transmission element and operative from a control position remote from said engine comprising, a double acting pneumatic cylinder connected to engage and disengage the clutch of the engine, a source of compressed air, a thermostatically controlled valve thermally associated with the engine and connected to said source, a secondary air conduit connected to said thermostatic valve and open therethrough to said source in the normal thermal condition of said thermostatic valve and engine but closed from said source by said valve in the overheated condition of said engine, a pair of valves having balanced valve elements, means connecting said pair of valves to said source whereby primary air pressure is exerted against one end of each balanced element to urge said elements to open position, said pair of valves having outlet ports opening to said source in the unbalanced position of said valve elements, a conduit connecting the lubricating oil pressure system of the engine to one of said pair of valves, an expansible element in said one valve responsive to oil pressure in said oil conduit and engageable with the valve element in said one valve in opposition to said primary air pressure, a second expansive element acting against the other of said valve elements in opposition to said primary air pressure, said secondary air conduit being connected to said second expansive element to actuate the same, a manually operative normally open shut-off valve connected to cut off the flow of air through said pair of valves, an emergency air conduit connected to the outlets of said pair of valves, a second pneumatic cylinder connected to said emergency conduit to be activated therefrom and connected to close the fuel supply of the engine when activated, a manually controlled valve having a pair of valve chambers connected to said source and having outlet ports connected respectively to the clutch engaging and clutch disengaging ends of said first pneumatic cylinder, valve elements in said chambers biased to closed position, actuating plungers associated with each of said last valve elements, a manually operative lever pivoted on said control valve and engageable with said plungers on opposite sides of its pivot, and a pneumatically operated piston positioned in said control valve and engageable with said lever to move said lever and one of said valve elements to clutch disengaging position, said last pneumatic piston being connected to said emergency conduit to be activated thereby.

3. Control mechanism for an internal combustion engine connectable to a power transmission element and operative from a control position remote from said engine comprising, a double acting pneumatic cylinder connected to engage and disengage the clutch of the engine, a source of compressed air, a thermostatically controlled valve thermally associated with the engine and connected to said source, a secondary air conduit connected to said thermostatic valve and open therethrough to said source in the normal thermal condition of said thermostatic valve and engine but closed from said source by said valve in the overheated condition of said engine, a pair of valves having balanced valve elements, means connecting said pair of valves to said source whereby primary air pressure is exerted against one end of each balanced element to urge said elements to open position, said pair of valves having outlet ports opening to said source in the unbalanced position of said valve elements, a conduit connecting the lubricating oil pressure system of the engine to one of said pair of valves, an expansible element in said one valve responsive to oil pressure in said oil conduit and engageable with the valve element in said one valve in opposition to said primary air pressure, a second expansive element acting against the other of said valve elements in opposition to said primary air pressure, said secondary air conduit being connected to said second expansive element to actuate the same, a manually operative normally open shut-off valve connected to cut off the flow of air through said pair of valves, an emergency air conduit connected to the outlets of said pair of valves, a manually controlled valve having a pair of valve chambers connected to said source and having outlet ports connected respectively to the clutch engaging and clutch disengaging ends of said pneumatic cylinder, valve elements in said chambers biased to closed position, actuating plungers associated with each of said last valve elements, a manually operative lever pivoted on said control valve and engageable with said plungers on opposite sides of its pivot, and a pneumatically operated piston positioned in said control valve and engageable with said lever to move said lever and one of said valve elements to clutch disengaging position, said last pneumatic piston being connected to said emergency conduit to be activated thereby.

4. A manual and automatic control system for an internal combustion engine having a pneumatic clutch comprising, a source of compressed air, a pair of valves having balanced valve elements and outlet ports, a conduit connecting said pair of valves to said source whereby compressed air urges said valve elements to open said ports to said source, a thermostatic valve thermally associated with said engine and connected to said source, a secondary air conduit connected to said thermostatic valve and open therethrough to said source in the normal thermal condition of said engine and thermostatic valve, said secondary air conduit being connected to one of said pair of valves whereby secondary air pressure acts against the valve element in said one valve in opposition to the primary air pressure therein, an oil pressure line connected to the pressure lubricating system of said engine and connected to the other of said valves whereby oil pressure acts against the valve element in said other valve in opposition to said primary air pressure, check valves connected to each of said ports and delivering to a manually operated normally open shut-off valve, an emergency air conduit delivering from said shut-off valve, a pneumatic cylinder connected to said emergency conduit to be activated therefrom and connected to the fuel supply system of the engine to shut off the supply of fuel when activated, a conduit connecting said source to said pneumatic clutch for engaging the same, a manually operative valve in said last conduit, an exhaust valve in said last conduit and including a double acting valve element alternatively connecting said pneumatic clutch to said conduit or to the atmosphere and spring biased to conduit connecting position, a diaphragm in said exhaust valve engageable with said double acting valve element and having a greater cross sectional area than said double acting valve element, and a connection opening between said emergency air conduit and said diaphragm on the opposite side thereof from said double acting valve element.

5. A manual and automatic control system for an internal combustion engine having a pneumatic clutch comprising, a source of compressed air, a pair of valves having valve elements and outlet ports, a conduit connecting said pair of valves to said source whereby said valve elements open said ports to said source, a thermostatic valve thermally associated with said engine and connected to said source, a secondary air conduit connected to said thermostatic valve and open therethrough to said source in the normal thermal condition of said engine and thermostatic valve, said secondary air conduit being connected to one of said pair of valves whereby secondary air pressure acts against the valve element in said one valve to close the port therein, an oil pressure line connected to the pressure lubricating system of said engine and connected to the other of said valves whereby oil pressure acts against the valve element in said other valve to close the port therein, an emergency air conduit delivering from said pair of valves, a pneumatic cylinder connected to said emergency conduit to be activated therefrom and connected to the fuel supply system of the engine to shut off the supply of fuel when activated, a conduit connecting said source to said pneumatic clutch for engaging the same, a manually operative valve in said last conduit, an exhaust valve in said last conduit and including a double acting valve element alternatively connecting said pneumatic clutch to said conduit or to the atmosphere and biased to conduit connecting position, a diaphragm in said exhaust valve engageable with said double acting valve element in opposition to the bias thereon, and a connection opening between said emergency air conduit and said diaphragm on the opposite side thereof from said double acting valve element.

6. A manual and automatic control system for an internal combustion engine having a pneumatic clutch comprising, a source of compressed air, a pair of valves having outlet ports, a conduit connecting said pair of valves to said source whereby said valves are operative to open said ports to said source, a thermostatic valve thermally associated with said engine and connected to said source, a secondary air conduit connected to said thermostatic valve and open therethrough to said source in the normal thermal condition of said engine and thermostatic valve, said secondary air conduit being connected to one of said pair of valves whereby secondary air pressure acts to close said one valve, an oil pressure line connected to the pressure lubricating system of said engine and connected to the other of said valves whereby oil pressure acts against to close said other valve, a manually operated normally open shut-off valve connected to stop the flow of air through said ports, an emergency air conduit delivering from said pair of valves, a pneumatic cylinder connected to said emergency conduit to be activated therefrom and connected to an essential control of the engine to shut off the engine when activated, a conduit connecting said source to said pneumatic clutch for engaging the same, a manually operative valve in said last conduit, an exhaust valve in said last conduit and including a double acting valve element alternatively connecting said pneumatic clutch to said last conduit or to the atmosphere and biased to conduit connecting position, a diaphragm in said exhaust valve engageable with said double acting valve element in opposition to the bias thereon, and a connection opening between said emergency air conduit and said diaphragm on opposite side thereof from said double acting valve element.

7. A manual and automatic control system for an internal combustion engine having a pneumatic clutch comprising, a source of compressed air, a pair of valves having outlet ports, a conduit connecting said pair of valves to said source whereby said valves are operative to open said ports to said source, a thermostatic valve thermally associated with said engine and connected to said source, a secondary air conduit connected to said thermostatic valve and open therethrough to said source in the normal thermal condition of said engine and thermostatic valve, said secondary air conduit being connected to one of said pair of valves whereby secondary air pressure acts to close said one valve, an oil pressure line connected to the pressure lubricating system of said engine and connected to the other of said valves whereby oil pressure acts against to close said other valve, a manually operated normally open shut-off valve connected to stop the flow of air through said ports, an emergency air conduit delivering from said pair of valves, a conduit connecting said source to said pneumatic clutch for engaging the same, an exhaust valve in said last conduit and including a double acting valve element alternatively connecting said pneumatic clutch to said last conduit or to the atmosphere and biased to conduit connecting position, a diaphragm in said exhaust valve engageable with said double acting valve element in opposition to the bias thereon, and a connection opening between said emergency air conduit and said diaphragm on opposite side thereof from said double acting valve element.

8. A manual and automatic control system for an internal combustion engine having a pneumatic clutch comprising, a source of compressed air, a pair of valves having inlet and outlet ports and biased to open position, a conduit connecting said inlet ports to said source, a thermostatic valve thermally associated with said engine and connected to said source, a secondary air conduit connected to said thermostatic valve and open therethrough to said source in the normal thermal condition of said engine and thermostatic valve, said secondary air conduit being connected to one of said pair of valves whereby secondary air pressure acts to close said one valve, an oil pressure line connected to the pressure lubricating system of said engine and connected to the other of said valves whereby oil pressure acts to close said other valve, check valves arranged to prevent back flow between said pair of valves, a manually operated normally open shut-off valve connected to stop the flow of air through said pair of valves, an emergency air conduit delivering from said pair of valves, a conduit connecting said source to said pneumatic clutch for engaging the same, a manually operative valve in said last conduit, an exhaust valve in said last conduit and including a double acting valve element alternatively connecting said pneumatic clutch to said conduit or to the atmosphere and biased to clutch engaging position, a pneumatically actuated element in said exhaust valve engageable with said double acting valve element in opposition to the bias thereon, and a connection opening between said emergency air conduit and said element to actuate said element and double acting valve to clutch disengaging position.

9. A manual and automatic control system for an internal combustion engine having a pneumatic clutch comprising, a source of compressed air, a pair of valves having inlet and outlet ports and biased to open position, a conduit connecting said inlet ports to said source, a thermostatic valve thermally associated with said engine and connected to said source, a secondary air conduit connected to said thermostatic valve and open therethrough to said source in the normal thermal condition of said engine and thermostatic valve, said secondary air conduit being connected to one of said pair of valves whereby secondary air pressure acts to close said one valve, an oil pressure line connected to the pressure lubricating system of said engine and connected to the other of said valves whereby oil pressure acts to close said other valve, a manually operated normally open shut-off valve connected to stop the flow of air through said pair of valves, an emergency air conduit delivering from said pair of valves, a conduit connecting said source to said pneumatic clutch for engaging the same, a manually operative valve in said last conduit, an exhaust valve in said last conduit and including a double acting valve element alternatively connecting said pneumatic clutch to said conduit or to the atmosphere and biased to clutch engaging position, a pneumatically actuated element in said exhaust valve engageable with said double acting valve element in opposition to the bias thereon, and a connection opening between said emergency air conduit and said element to actuate said element and double acting valve to clutch disengaging position.

10. An emergency shut-down control system for an internal combustion engine having a clutch and ignition system comprising, a source of compressed air, a thermostatic valve thermally associated with said engine and connected to said source, a pair of valves connected to said source and having balanced valve elements therein open to said source and arranged when balanced to close said valves to the passage of air, a secondary air conduit connected between said thermostatic valve and one of said pair of valves to deliver secondary air through said thermostatic valve in the normal thermal condition of said engine and thermostatic valve to said one of said pair of valves, said secondary air acting against the valve element in said one valve in opposition to the primary source of air to balance said one valve, an oil conduit connecting the other of said pair of valves to the pressure lubricating system of the engine, oil pressure in said conduit acting against the other of said valve elements in opposition to the pressure of said primary air source to balance said other valve, check valves connected to the outlet ports of said pair of valves and delivering to a manually controlled normally open shut-off valve, an emergency air conduit delivering from said shut-off valve, a pneumatic device mechanically connected to the clutch of said engine to disengage the same when activated, said device being pneumatically connected to said emergency conduit, and a second pneumatic device connected to an ignition switch of said engine and to said emergency conduit to de-energize said engine.

11. An emergency shut-down control system for an internal combustion engine having a clutch and ignition system comprising, a source of compressed air, a thermostatic valve thermally associated with said engine and connected to said source, a pair of valves connected to said source and having balanced valve elements therein open to said source and arranged when balanced to close said valves to the passage of air, a secondary air conduit connected between said thermostatic valve and one of said pair of valves to deliver secondary air through said thermostatic valve in the normal thermal condition of said engine and thermostatic valve to said one of said pair of valves, said secondary air acting against the valve element in said one valve to balance said one valve, an oil conduit connecting the other of said pair of valves to the pressure lubricating system of the engine, oil pressure in said conduit acting against the other of said valve elements to balance said other valve, an emergency air conduit delivering from said pair of valves, a pneumatic device mechanically connected to the clutch of said engine to disengage the same when activated, said device being pneumatically connected to said emergency conduit, and a second pneumatic device conected to an ignition switch of said engine and to said emergency conduit to de-energize said engine.

12. An emergency control system for an interial combustion engine having a clutch comprising, a source of compressed air, a thermostatic valve thermally associated with said engine and connected to said source, a pair of valves connected to said source and having valve elements therein arranged to close said valves from said source, means biasing said valve elements to open position when said system is operating, a secondary air conduit connected between said thermostatic valve and one of said pair of valves to deliver secondary air through said thermostatic valve in the normal thermal condition of said thermostatic valve to said one of said pair of valves, said secondary air acting against the valve element in said one valve to close said one valve, against the bias thereof, an oil conduit connecting the other of said pair of valves to the pressure lubricating system of the engine, oil pressure in said conduit acting against the other of said valve elements to close said other valve against the bias thereof, an emergency air conduit delivering from said pair of valves, and a pneumatic device mechanically connected to the clutch of said engine to disengage the same when activated, said device being pneumatically connected to said emergency conduit.

13. An emergency shut-down control system for an internal combustion engine having a clutch and an essential supply system comprising, a source of compressed air, a thermostatic valve thermally associated with said engine and connected to said source, a pair of valves connected to said source and having valve elements therein arranged to close said valves, said valve elements being biased to open position when said system is operating, a secondary air conduit connected between said thermostatic valve and one of said pair of valves to deliver secondary air through said thermostatic valve in the normal thermal condition of said engine and thermostatic valve, a pneumatically actuated member in said secondary air conduit acting against the valve element in said one valve to close said one valve against the bias thereof, an oil conduit connecting the other of said pair of valves to the pressure lubricating system of the engine, a fluid actuated member in said oil conduit acting against the other of said valve elements to close said other valve against the bias thereof, a manually controlled normally open shut-off valve connected to prevent the flow of air through either of said pair of valves, an emergency air conduit delivering from said pair of valves, a pneumatic device mechanically connected to disengage said clutch when activated, said device being pneumatically connected to said emergency conduit, and a second pneumatic device mechanically connected to control said essential supply system and pneumatically connected to said emergency conduit to de-energize said engine when said emergency conduit is supplied with air pressure.

14. An emergency shut-down control system for an internal combustion engine having an essential supply system comprising, a source of compressed air, a thermostatic valve thermally associated with said engine and connected to said source, a pair of valves connected to said source and having valve elements therein arranged to close said valves, said valve elements being biased to open position when said system is operating, a secondary air conduit connected between said thermostatic valve and one of said pair of valves to deliver secondary air through said thermostatic valve in the normal thermal condition of said engine and thermostatic valve, a pneumatically actuated member in said secondary air conduit acting against the valve element in said one valve to close said one valve against the bias thereof, an oil conduit connecting the other of said pair of valves to the pressure lubricating system of the engine, a fluid actuated member in said oil conduit acting against the other of said valve elements to close said other valve against the bias thereof, a manually controlled normally open shut-off valve connected to prevent the flow of air through either of said pair of valves, an emergency air conduit delivering from said pair of valves, and a pneumatic device mechanicaly connected to control said essential supply system and pneumatically connected to said emergency conduit to de-energize said engine when said emergency conduit is supplied with air pressure.

WALTER A. KYSOR.

REFERENCES CITED

The following references are of record in the file of this patent:

UNITED STATES PATENTS

| Number | Name | Date |
| --- | --- | --- |
| 1,901,554 | DeWilder | Mar. 14, 1933 |
| 2,010,960 | Pogue | Aug. 13, 1935 |
| 2,162,174 | Jones | June 13, 1939 |
| 2,201,123 | Davis | May 14, 1940 |
| 2,225,234 | Schettler | Dec. 17, 1940 |
| 2,260,576 | Maybach | Oct. 28, 1941 |
| 2,377,457 | Stalker | June 5, 1945 |
| 2,423,728 | Ray | July 8, 1947 |
| 2,462,825 | Zimmerman | Feb. 22, 1949 |